US009108655B2

(12) United States Patent
Sebastian et al.

(10) Patent No.: US 9,108,655 B2
(45) Date of Patent: Aug. 18, 2015

(54) BASKET

(71) Applicant: Araven S.L., Zaragoza (ES)

(72) Inventors: Marcos Alcala Sebastian, Zaragoza (ES); Maria Isabel Gimeno Verdejo, Zaragoza (ES); Jose Antonio Puertolas Salanova, Zaragoza (ES)

(73) Assignee: ARAVEN, S.L., Zaragoza (ES)

( * ) Notice: Subject to any disclaimer, the term of this patent is extended or adjusted under 35 U.S.C. 154(b) by 0 days.

(21) Appl. No.: 14/187,989

(22) Filed: Feb. 24, 2014

(65) Prior Publication Data

US 2014/0210171 A1 Jul. 31, 2014

Related U.S. Application Data

(63) Continuation of application No. 12/190,142, filed on Aug. 12, 2008, now abandoned, which is a continuation of application No. 11/054,419, filed on Feb. 9, 2005, now Pat. No. 7,431,312.

(30) Foreign Application Priority Data

Nov. 18, 2004 (ES) .................................. 200402780

(51) Int. Cl.
*B62B 3/14* (2006.01)
*B62B 3/02* (2006.01)
(Continued)

(52) U.S. Cl.
CPC . *B62B 3/02* (2013.01); *A47F 10/04* (2013.01); *B62B 1/006* (2013.01); *B62B 1/12* (2013.01); *B62B 1/125* (2013.01); *B62B 3/165* (2013.01);
(Continued)

(58) Field of Classification Search
CPC .......... B62B 1/006; B62B 3/16; B62B 3/165; B62B 5/067; A47F 10/04
USPC ......................... 206/505, 507, 512, 515, 519; 280/33.998, 47.26, 47.371, 79.2, 280/47.17, 47.131, 47.24, 47.315; 220/676, 220/485, 380; 190/18 A
See application file for complete search history.

(56) References Cited

U.S. PATENT DOCUMENTS 1,689,448 A 10/1928 Moynahan
3,346,271 A 10/1967 Parsons
(Continued)

FOREIGN PATENT DOCUMENTS

EP 0780068 6/1997
EP 1407956 4/2004
(Continued)

OTHER PUBLICATIONS

U.S. Office Action dated Jul. 7, 2010 from corresponding U.S. Appl. No. 29/352,675.
(Continued)

*Primary Examiner* — Katy M Ebner
(74) *Attorney, Agent, or Firm* — Katten Muchin Rosenman LLP

(57) ABSTRACT

A basket for public use includes a substantially upright tapered body for repeatedly moving purchasable items within a store; the body includes an interior space and an open top; the open top permits access to the interior for placing the plurality of purchasable items in the interior. Wheels allow rolling the basket within the store and a telescoping handle provided on a face of the body rollingly pulls the basket. A like-basket is nestable in the basket in a first and a second position; eg the telescoping handles are proximate to each other or the telescoping handles are distal from each other.

28 Claims, 6 Drawing Sheets

(51) Int. Cl.
*A47F 10/04* (2006.01)
*B62B 1/00* (2006.01)
*B62B 1/12* (2006.01)
*B62B 3/16* (2006.01)
*A45C 3/04* (2006.01)
*B62B 5/06* (2006.01)

(52) U.S. Cl.
CPC . *A45C 3/04* (2013.01); *B62B 5/067* (2013.01); *B62B 2501/065* (2013.01)

(56) References Cited

U.S. PATENT DOCUMENTS

| | | | |
|---|---|---|---|
| 3,677,570 | A | 7/1972 | Hedu |
| 4,185,848 | A | 1/1980 | Holtz |
| 4,217,711 | A | 8/1980 | Spresser et al. |
| 4,238,897 | A | 12/1980 | Byers |
| 4,765,074 | A | 8/1988 | Loos |
| 4,765,077 | A | 8/1988 | Rosenthal et al. |
| 4,773,175 | A | 9/1988 | Larsen |
| 4,805,331 | A | 2/1989 | Boggess et al. |
| 4,871,209 | A | 10/1989 | Handelman |
| 5,253,739 | A | 10/1993 | King |
| 5,469,986 | A | 11/1995 | Jang |
| 5,901,482 | A | 5/1999 | Sawyer et al. |
| 5,988,334 | A | 11/1999 | Caruso |
| 6,036,204 | A | 3/2000 | Craft et al. |
| 6,079,720 | A | 6/2000 | Spear et al. |
| 6,116,390 | A | 9/2000 | Cohen |
| 6,179,176 | B1 | 1/2001 | Saggese et al. |
| 6,193,033 | B1 | 2/2001 | Sadow et al. |
| D440,020 | S | 4/2001 | Ronson et al. |
| 6,349,951 | B1 | 2/2002 | Mogensen et al. |
| 6,431,580 | B1 | 8/2002 | Kady |
| D468,619 | S | 1/2003 | Nofziger et al. |
| 6,543,795 | B1 | 4/2003 | Merced Ferrer |
| 6,651,992 | B1 | 11/2003 | Smith |
| D486,619 | S | 2/2004 | Rivera et al. |
| D533,327 | S | 12/2006 | McCaskill |
| D544,159 | S | 6/2007 | McCoy et al. |
| D546,511 | S | 7/2007 | Luster |
| 7,252,295 | B2 | 8/2007 | Bludworth |
| D563,620 | S | 3/2008 | Dong et al. |
| 7,494,136 | B2 | 2/2009 | Alves et al. |
| 2002/0171288 | A1 | 11/2002 | Ahlgren |
| 2005/0087415 | A1 | 4/2005 | Gorga et al. |
| 2005/0140119 | A1 | 6/2005 | Wong |
| 2006/0103087 | A1 | 5/2006 | Alcala Sebastian |
| 2008/0309036 | A1 | 12/2008 | Overland |

FOREIGN PATENT DOCUMENTS

| | | |
|---|---|---|
| ES | 1000987 | 12/1986 |
| ES | 1027023 | 2/1994 |
| ES | 1032273 | 10/1995 |
| ES | 2159178 | 9/2001 |
| WO | 98/13269 | 4/1998 |

OTHER PUBLICATIONS

U.S. Office Action dated Jul. 8, 2010 from corresponding U.S. Appl. No. 29/352,677.
U.S. Office Action dated Sep. 29, 2009 from the corresponding U.S. Appl. No. 29/306,355.
International Search Report and Written Opinion of the International Searching Authority dated Apr. 19, 2005 for the corresponding International Application No. PCT/ES2005/000044.
European Patent Application 1834539—Araven S.A. Observations under Article 115 EPC.
U.S. Office Action dated May 11, 2009 from corresponding U.S. Appl. No. 12/190,142.
U.S. Office Action dated Jan. 7, 2010 from corresponding U.S. Appl. No. 12/190,142.
U.S. Office Action dated Jan. 13, 2010 from corresponding U.S. Appl. No. 12/190,142.
U.S. Office Action dated Oct. 20, 2010 from corresponding U.S. Appl. No. 12/190,142.
U.S. Office Action dated Jun. 20, 2011 from corresponding U.S. Appl. No. 12/190,142.
U.S. Office Action dated Jan. 19, 2012 from corresponding U.S. Appl. No. 12/190,142.
U.S. Office Action dated Apr. 9, 2013 from corresponding U.S. Appl. No. 12/190,142.
Notice of Allowance dated Nov. 19, 2013 from corresponding U.S. Appl. No. 12/190,142.
File History for U.S. Appl. No. 12/190,142.
U.S. Office Action dated Oct. 2, 2007 from corresponding U.S. Appl. No. 11/054,419.
U.S. Office Action dated Jul. 18, 2007 from corresponding U.S. Appl. No. 11/054,419.
U.S. Office Action dated Feb. 6, 2007 from corresponding U.S. Appl. No. 11/054,419.
Notice of Allowance dated Jul. 8, 2008 from corresponding U.S. Appl. No. 11/054,419.
Notice of Allowance dated Mar. 27, 2008 from corresponding U.S. Appl. No. 11/054,419.
File History for U.S. Appl. No. 11/054,419.

BASKET

CROSS-REFERENCE TO RELATED APPLICATION

This application is a continuation application of and claims priority to U.S. Ser. No. 12/190,142 which was filed on Aug. 12, 2008 and which is now pending and incorporated by reference in its entirety for all purposes. U.S. Ser. No. 12/190, 142 claims priority to U.S. Ser. No. 11/054,419 which was filed on Feb. 9, 2005 and is now U.S. Pat. No. 7,431,312 and is incorporated by reference in its entirety for all purposes. U.S. Ser. No. 11/504,419 claims priority from Spanish Patent Application Number 200402780 which was filed on Nov. 18, 2004, the contents of which are herein wholly incorporated by reference.

OBJECT OF THE INVENTION

This invention relates to an improved stackable basket of those used by customers in self-service shops or supermarkets, of the type that can be stacked on one another and are basically constituted by a single body with rounded edges of a strong plastic material that has a number of orifices or incuts and allows holding the products in it before they are placed on the checkout counter to pay for them.

The object of this invention is to provide a basket that, while maintaining a structure and composition that provide durability and reliability, can be easily handled and saves the user efforts resulting from carrying it when the items to purchase are contained in it, also providing it in addition to a normal handle with a telescopic handle that together with wheels fitted on its base allow carrying this basket as if it were a small cart, in a manner that is more comfortable and simple for the user regardless of his/her physical condition.

Also the object of this invention is to provide a system that at the time of stacking ensures the required hygiene without detriment to said stacking, by protecting the base of the basket on which the items rest from the dirt remains accumulated in the wheels of the basket that is fitted on top when the various baskets are stacked on one another.

BACKGROUND OF THE INVENTION

A large number of baskets are available in the market meant for use in supermarkets or self-service shops for customers to carry the items to the check-out boxes where they are paid for.

These baskets normally replace the conventional metal carts with wheels when no more are available, when the customer intends to purchase a small number of items that do not require using said cart or when the characteristics of the shop make it impossible to use said carts.

In these cases, the baskets conventionally used are embodied as containers generally made of lightweight yet strong plastic provided with one or more handles that allow the user to carry them about the premises and place the items in them. These handles are incorporated in the structure of the basket, so that they are not an obstacle when stacking them, as in the case of Utility Model U8601633, held by the present applicant, U9400303, U9502610, or application WO 98/13269.

However, this type of basket has the main drawback of having to be carried when placing a large number of items in it, which generally implies an excessive weight that can exceed 20 kilograms. This is not only uncomfortable for the user, particularly for the elderly, but also a safety problem as it can lead to injuries from overexertion or accidental impacts or falling items.

To solve this problem, baskets have been developed that on one hand allow stacking and on another a more comfortable use, as in the case of patent EP 1407956 relating to a basket which, in addition to the typical handles used to carry the basket in a known manner, has a traction handle and wheels allowing the basket to rest on the floor and be carried without having to lift it off the ground.

This system, although it solves the problem of the user having to lift the weight of the items, has significant drawbacks such as the handle size being determined by that of the basket, as it must be integrated in the frame do that stacking is not prevented, meaning that the handle will be the same for all users, or in other words that the length of this handle cannot be adapted to the height and physical characteristics of the user, so that for many users the handle will be too long or too short. In this way, if different baskets were manufactured to provide different handle lengths to adapt to various users, the dimensions of these baskets would be determined by those of the handle, as baskets with short handles for short customers must also be small to be able to house such a handle, while if baskets are made with longer handles for taller customers these will be larger. This would obviously imply the need to manufacture baskets with different sizes to satisfy the needs of different types of users, resulting in an excessive cost of the service.

These baskets also have an added drawback regarding the lack of hygiene. Indeed, the construction characteristics of the baskets mean that when they are stacked their wheels are housed in the area intended for the items of the basket immediately below, so that the dirt accumulated in the wheels and the shaft joining these as the basket is rolled on the supermarket floor will either be in contact with the inner base of the basket or will fall from the wheel or the shaft, ending on said base. The dirt in these baskets will result in their rejection by the users, as they will avoid using them when they are dirty in view of the type of products to be housed in them, generally food items.

DESCRIPTION OF THE INVENTION

The improved stackable basket disclosed solves the aforementioned drawbacks in an effective manner, allowing on one hand its convenient handling by all types of users and on the other maintaining their hygiene, which is not affected by stacking them.

To this end, the basket of the invention is provided on one hand with a telescopic handle that is perfectly collected and integrated in the basket structure in the resting position, so that it does not prevent stacking the baskets, and on the other hand is provided with internal walls or turrets placed on the base of each basket that are located on the vertical projection of the wheels of the basket placed above it in the stack, preventing the dirt in the latter from being deposited on the base of the baskets.

More specifically, the basket of the invention is provided on one hand with a conventional hinged handle, of the type which in a resting position lies on the basket's top frame and is integrated in it to facilitate stacking. As described above, this handle allows the user to carry the basket by lifting it, supporting its full weight.

In addition to this conventional handle is also provided a new telescopic handle which in the resting position is perfectly integrated in the basket body, facilitating its stacking. This telescopic handle is also provided with means allowing it to be fixed at its maximum length without retraction, this is, when it is fully extended, remaining fixed until a new user or the same one decides to retract it until it returns to its resting position.

The telescopic handle is preferably integrated on one of the side faces of the basket, abutting it inner or outer wall or even inside it, so that it does not interfere with the other conventional hinged handle.

It is also possible for the telescopic handle to have a folding segment, specifically on its free end, in which case the end bearing the grip will either rest on the notch or recess of the baskets upper frame or on the conventional handle, thereby allowing stacking.

The face bearing the telescopic handle also holds the wheels, more specifically on the bottom corners of this face, the other two bottom corners having legs or supports that form part of a peripheral rib that adds stability to the basket when it is set vertically on the ground, this is, in a resting position.

These wheels are preferably constructed without a common shaft connecting them, thereby eliminating the possibility of this shaft accumulating dirt collected while the basket rolls on the ground with the aid of the wheels, which would then fall on the basket below it when it is stacked.

On another hand, to preserve the hygiene of the baskets these are provided internally, at least at two of their corners and more specifically at those under which the wheels are located, with L-shaped internal walls or turrets that form a sort of cubicle with the walls of the basket meant to be located above the vertical projection of the wheels of the basket placed above it in the stack, so that the dirt deposited in this basket's wheels does not fall on the base of the basket below it but instead falls thorough said orifices or turrets towards a through orifice that is framed by the aforementioned walls and the basket sides.

These through orifices may be placed only on the vertices at which there is a wall or turret, or in all the vertices or the basket, in order to maintain hygiene when a user stacks a basket in an inverse position with respect to the other, so that if the wheels of the upper basket are not vertically aligned with the walls or turret of the lower basket the dirt from the wheels does not fall to the base of the lower basket but instead falls to the floor through said orifices.

The facts described above provide a stackable basket that is easily handled and comfortable for the user and guarantees the required hygiene.

DESCRIPTION OF THE DRAWINGS

To complete the description being made and in order to aid a better understanding of the characteristics of the invention, according to an example of a preferred embodiment, a set of drawings is accompanied as an integral part of the description where for purposes of illustration and in a non-limiting manner the following is shown.

PREFERRED EMBODIMENT OF THE INVENTION

Figure 1:
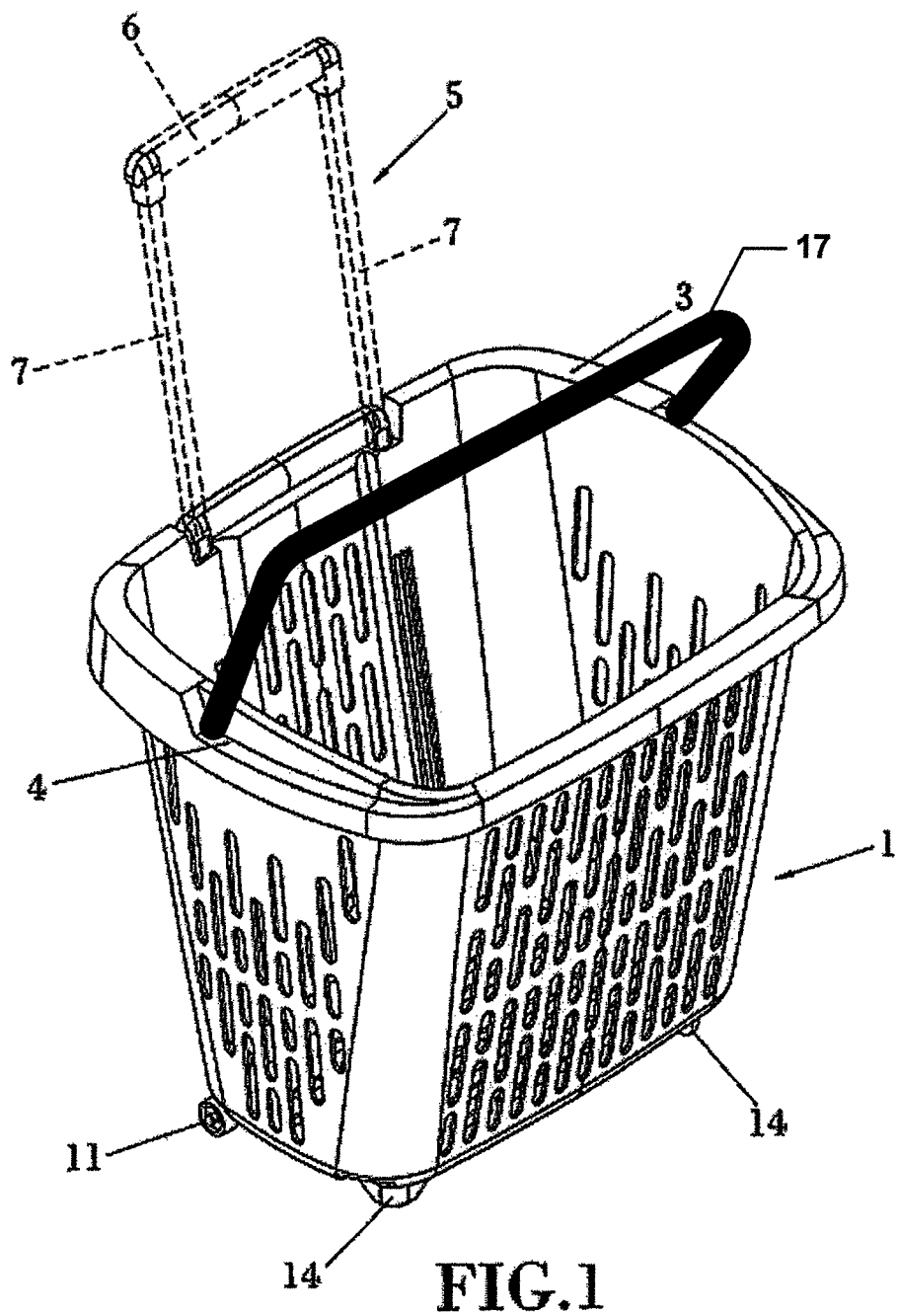
FIG. 1 shows an upper perspective view of the improved stackable basket showing the telescopic handle in two possible positions, as well as one of the wheels allowing to transport the basket.

In view of the described figures, it can be seen that the improved stackable basket (1) of the invention is basically constructed from a prism-shaped single body made of a strong material, such as plastic or the like, with a number of orifices or incuts (2) in all or some of its faces and with generally rounded edges.

As conventional baskets the improved stackable basket (1) of the invention is provided on its top part with a hinged handle 17 which in the resting position rests on the basket's upper frame or edge (3) and is integrated in it by a notch or incut (4) made in said edge (3) to facilitate stacking one tray on the other.

In addition to this conventional hinged handle, the basket (1) of the invention has a telescopic handle (5) with a corresponding handle (6). This handle (5) is place on one of the side faces of the basket (1), abutting its inner or outer wall or even inside it, and in general in the wall where it does not interfere with the conventional hinged handle.

The telescopic handle (5) can also have a folding segment, specifically its free end, in which case this end which includes the grip (6) will rest on either the notch or incut (4) of the top edge (3) or on the conventional handle, in order to allow stacking.

Figure 2:
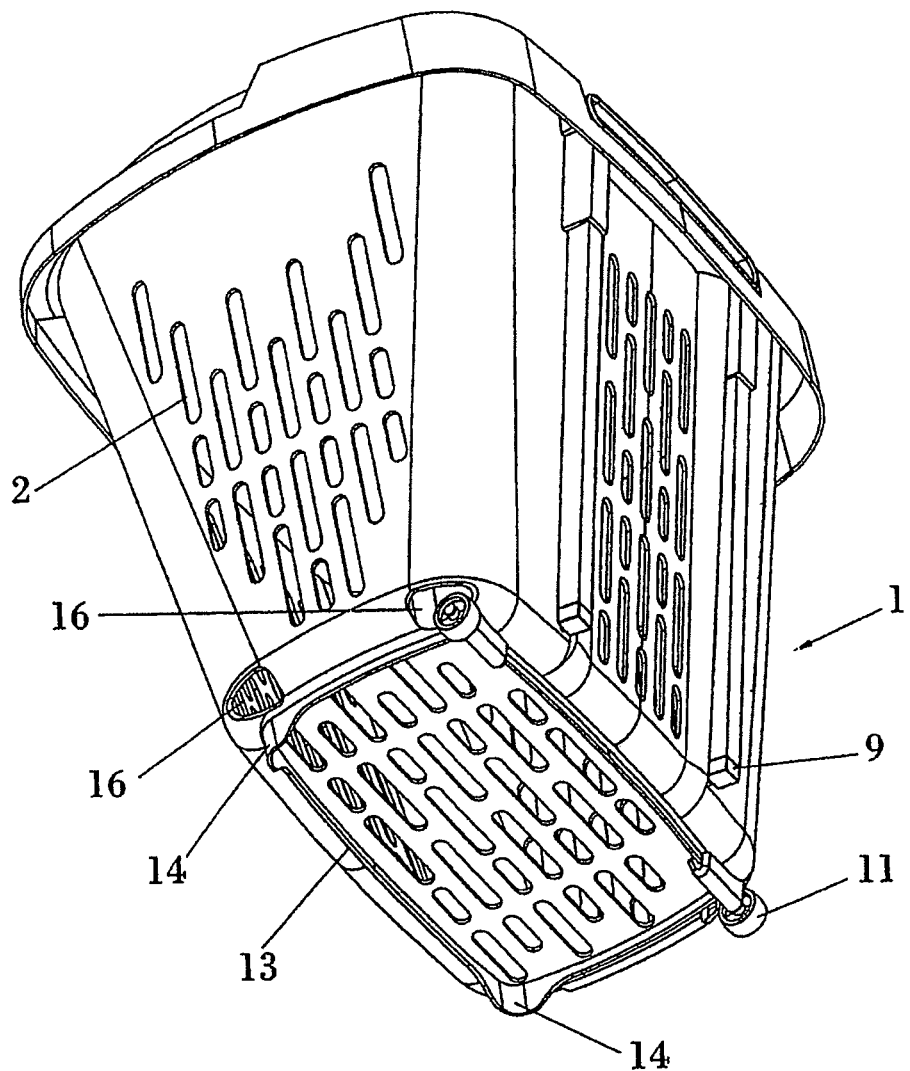
FIG. 2 shows a bottom perspective view of the improved stackable basket showing both the rear part of the telescopic handle and one of the wheels allowing to transport the basket.
Figure 3:
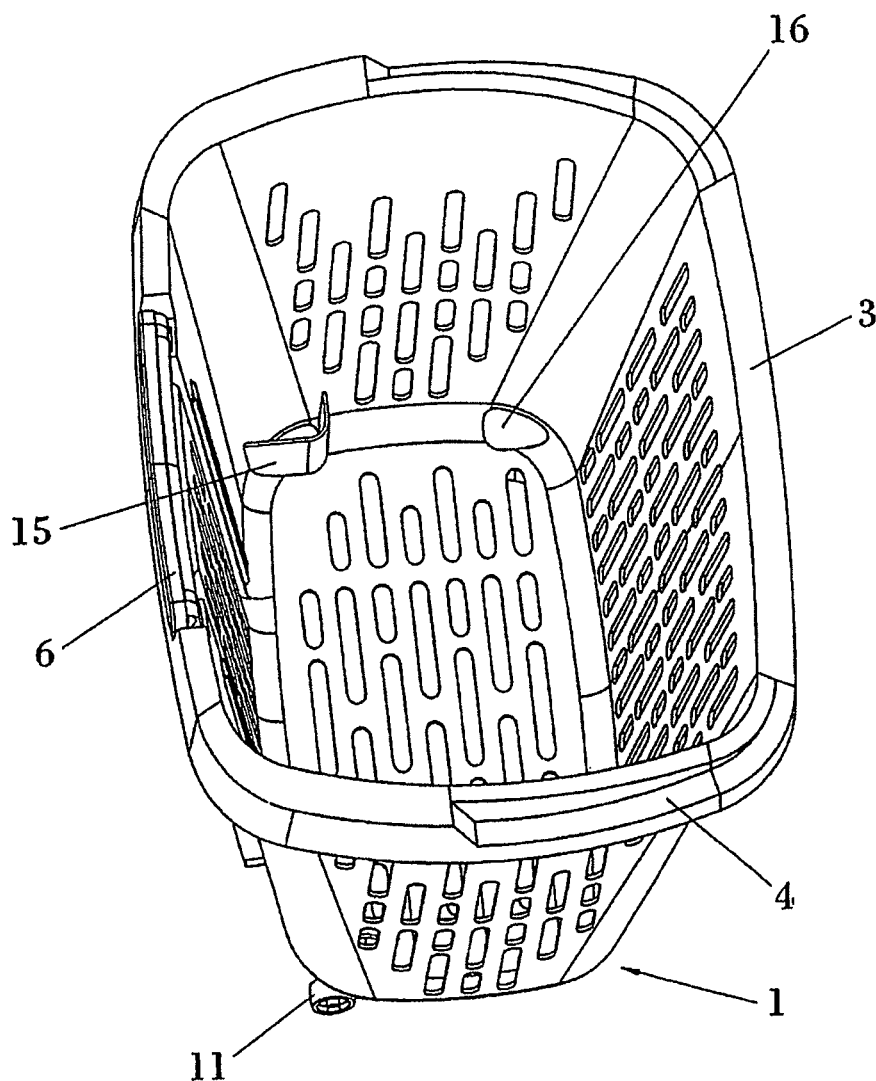
FIG. 3 shows an upper perspective view of the improved stackable basket showing both the internal walls or turrets and the orifices placed on the bottom of said basket.
Figure 4:
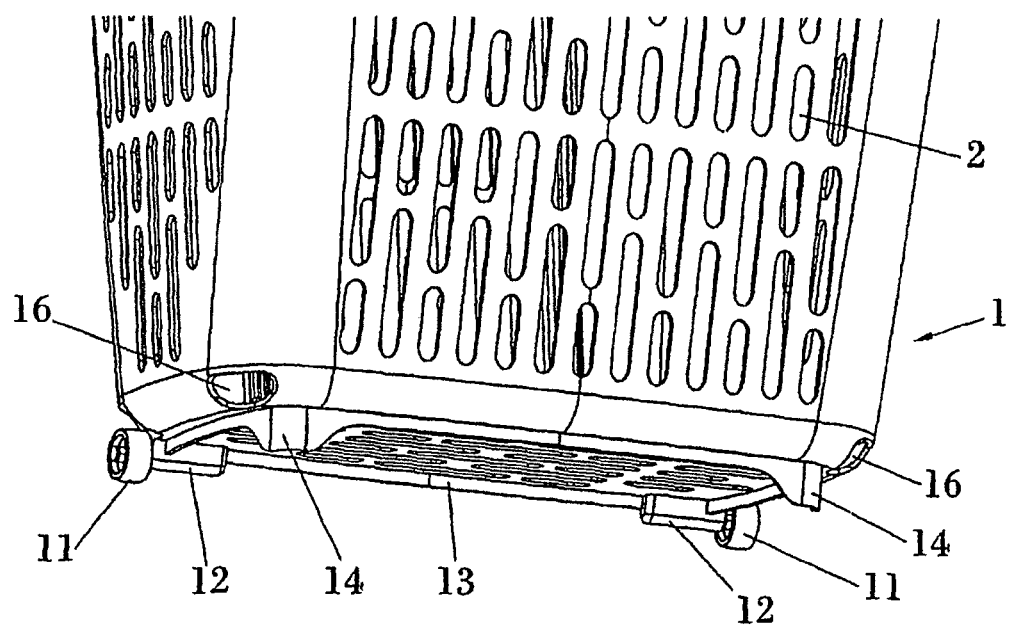
FIG. 4 shows an enlarged perspective view of the bottom part of the basket, showing both the orifices of the basket base and its legs and wheels.
Figure 5:
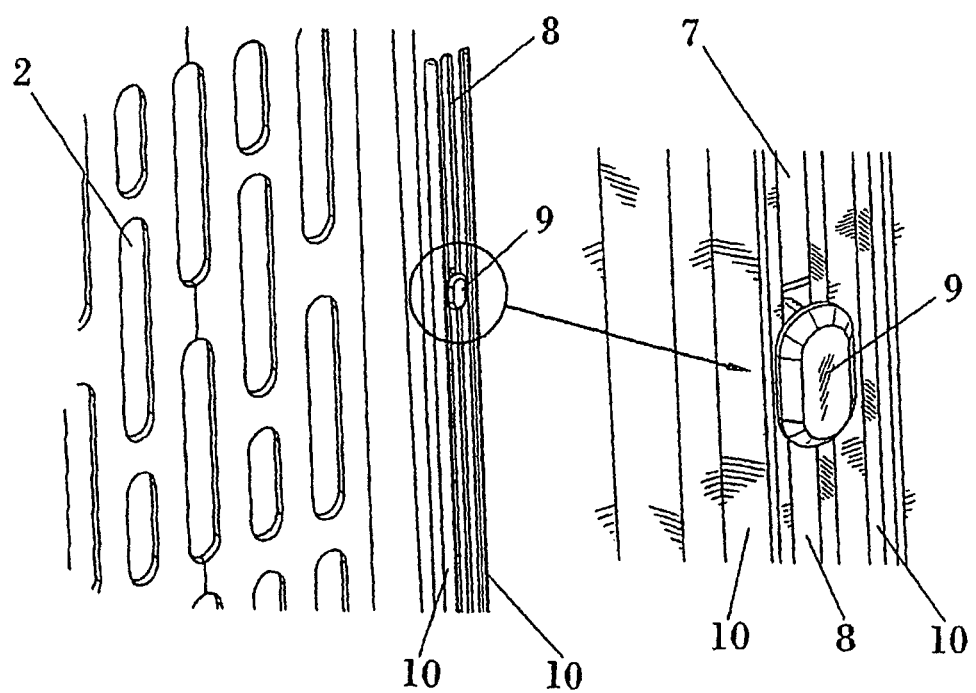
FIG. 5 shows a perspective view of one of the guides of the telescopic handle and a detail of this handle.
Figure 6:
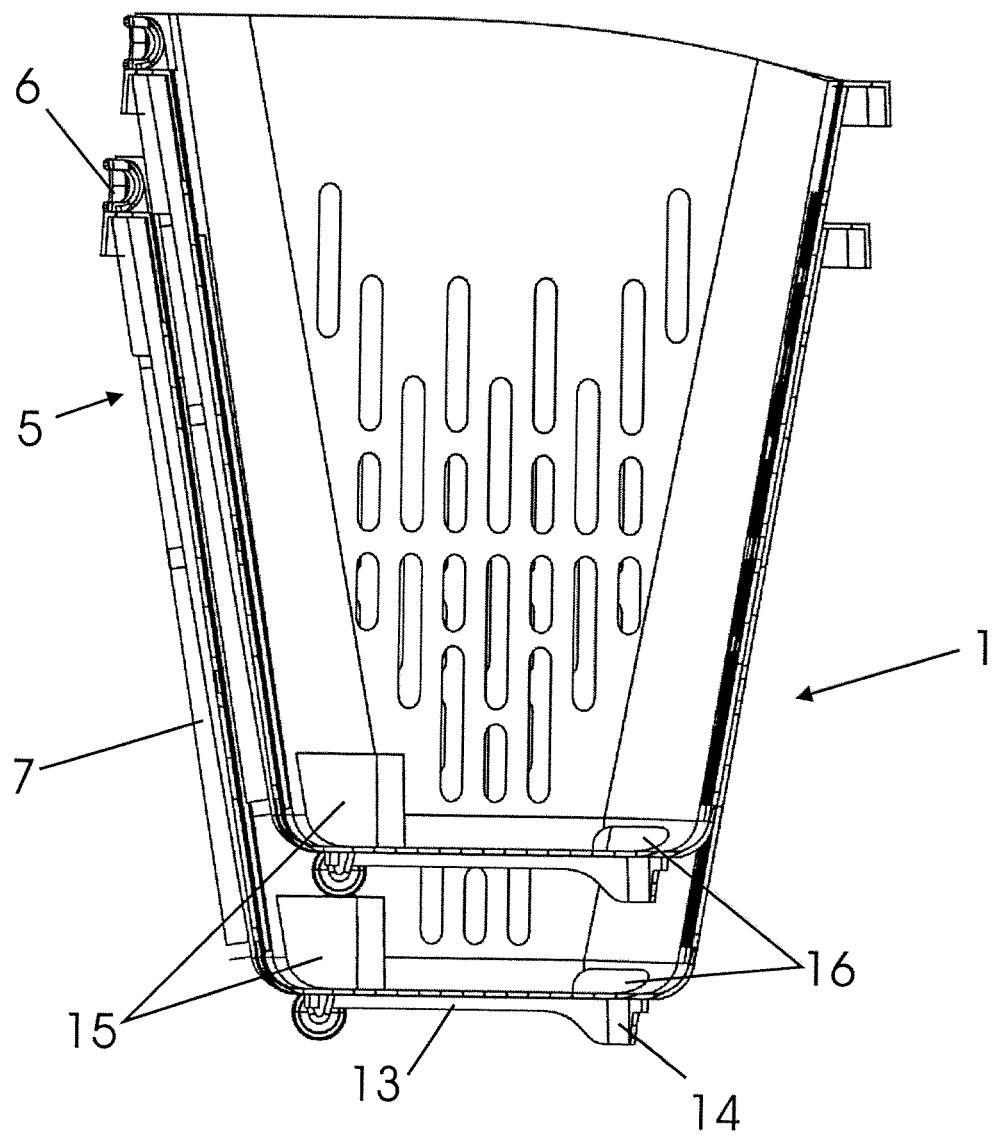
FIG. 6 shows a side view of the improved stackable basket showing one basket stacked on another, as well as the position of the wheels on the interior walls or turrets.

Specifically, in this example of embodiment as can be seen in FIGS. 1, 2, 5 and 6, the lateral telescopic segments (7) of the handle (5) run along the outer wall of the aforementioned face, this is, they travel along it by virtue of corresponding guide rails (8) along which run sliders (9) acting as stops provided in the bottom end of the corresponding telescopic segments (7), limiting the vertical displacement of the first portion of said telescopic segments (7) and preventing possible swivelling or lateral movement of the segments. Both the guide rail (8) and the sliders (9) acting as a stop are protected by two longitudinal protrusions (10) placed on either side of each rail (8) to prevent, in the case that the handle (5) is placed externally and therefore the sliders (9) jut out on the inside of the basket (1) as in the example of embodiment shown in the figures, that t items or packages introduced in the basket obstruct said rails (8), interfere with the aforementioned sliders (9) or damage them. Furthermore, these protrusions will prevent any object, such as the user's clothes, from obstructing said rails (8) when the handle (5) is placed internally and the sliders (9) jut outwards from the basket (1).

The telescopic handle (5) also has means that allow it to be fixed at a maximum height without retracting, i.e. when it is fully extended, remaining fixed until a user decides to fold said handle (5) to return it to its resting position, at which time it is fully integrated in the body of the basket (1), the grip (6) of said handle (5) being housed in the frame or edge (3) of the basket to facilitate stacking one basket on the other.

The improved stackable basket (1) of the invention is completed by wheels (11) placed in correspondence with the lower vertices of the side face housing the telescopic handle (5), independent of each other so that they are not connected by an axle, the axle of each wheel instead being housed in a small protective cubicle (12) that forms part of a peripheral rib (13) placed on the bottom of the basket (1). On its other two vertices the basket has a widening that gives rise to corresponding legs or supports (14) that stabilise the basket (1) when it is placed vertically on the floor, this is, in its resting position.

Lastly, it should be remarked that as can be seen in this example of embodiment, in correspondence with the vertices under which the wheels (11) are fitted the basket (1) is internally provided, on its base, with vertical L-shaped walls or turrets (15) that define a small cubicle together with the basket walls. In addition, the example represented in the figures shows a possible embodiment in which each of the four bottom vertices of the basket has a through orifice (16) which will be framed by the vertical turrets or walls (15) in the vertices that are provided with such.

In this way when the dirt of the wheels (11) of the basket (1) placed on top falls, it will not be deposited on the base of the basket below it but instead will fall to the ground through the orifices defined by the walls (15) and the orifices (16).

As described above, the characteristics of the improved stackable basket (1) of this invention provide great improvements in the comfort and handling of this type of baskets, while allowing to stack them and guaranteeing the required hygiene.

What is claimed is:

1. A basket for public use, the basket comprising:
   a substantially upright tapered body for repeatedly moving a plurality of purchasable items within a store, the body comprising an interior space and having an open top, the open top for permitting easy access to the interior for placing the plurality of purchasable items in the interior;
   a plurality of wheels for rolling the basket within the store;
   a telescoping handle movably secured to only one face of the body for rollingly pulling the basket on the plurality of wheels, the telescoping handle comprising a plurality of lateral segments, the telescoping handle being movable substantially parallel to the face from a stored position to an extended position customizable to a preferred height of a user;
   a plurality of guide rails associated with the only one face of the body, the plurality of guide rails for guiding the respective lateral segments;
   a plurality of movable sliders jutting into the interior space, each slider limiting a vertical displacement of a corresponding lateral segment relative to the basket and preventing swiveling of the corresponding lateral segment relative to the basket; and
   a pair of longitudinal protrusions associated with at least one guide rail for preventing obstruction the lateral segments during movement.

2. The basket of claim 1, wherein the body comprises a floor, the wheels being disposed at an edge of the floor proximate to the telescoping handle.

3. The basket of claim 1, wherein the body comprises a plurality of incuts in the body.

4. The basket of claim 1, wherein the telescoping handle is stored flush with a rim of the body.

5. The basket of claim 1, further comprising a hinged handle for carrying the basket.

6. The basket of claim 5, wherein the hinged handle is stored flush with a rim of the body.

7. The basket of claim 1, wherein the body comprises a floor and a plurality of openings provided substantially in the floor, the plurality of openings for passing dirt accumulated on the plurality of wheels of the like-basket.

8. The basket of claim 7, wherein the plurality of openings is disposed such that the dirt is passed when the like-basket is nested in the basket in the first and the second position.

9. The basket of claim 7, wherein each of the plurality of openings are proximal to a respective corner formed by two faces and are sized to have at least one dimension approximate to a diameter of one of the wheels.

10. The basket of claim 1, wherein the plurality of wheels consists of two wheels.

11. The basket of claim 1, wherein the upright tapered body and plurality wheels are nestable in a like basket substantially evenly to maintain stability of a plurality of nested baskets.

12. The basket of claim 1, wherein when a like-basket is nested in the basket in the first position, at least 80% of a length of the like-basket is nested inside the basket, as measured by a first perpendicular distance from a basket floor of the like-basket to a rim of the basket relative to a second perpendicular distance from the basket floor of the like-basket to a rim of the like-basket.

13. The basket of claim 1, wherein a like-basket is nestable in the basket in a first and a second position, the first position being one wherein the telescoping handles are proximate to each other, the second position being one wherein the telescoping handles are distal from each other.

14. A basket for moving purchasable goods in a store, the basket comprising:
   an angled front wall, an angled rear wall, and a pair of angled side walls defining an interior space;
   a pair of wheels for rolling the basket;
   a telescoping user-adjustable handle disposed on the rear wall, the telescoping user-adjustable handle comprising a plurality of lateral segments;
   a rim defining an open top and connecting the front wall, the rear wall, and the side walls;
   a plurality of guide rails disposed on the rear wall, the plurality of guide rails for guiding the respective lateral segments;
   a plurality of movable sliders, each slider limiting a vertical displacement of a corresponding lateral segment relative to the basket and preventing swiveling of the corresponding lateral segment relative to the basket; and
   a pair of longitudinal protrusions associated with at least one guide rail for preventing obstruction the lateral segments during movement;
   wherein the telescoping handle tilts the basket into a rolling position;
   wherein when the telescoping user-adjustable handle is disposed on an outside of the rear wall, the plurality of movable sliders jut into the interior space,
   wherein when the telescoping user-adjustable handle is disposed on an inside of the rear wall, the plurality of movable sliders jut outside of the interior space.

15. The basket of claim 14, wherein the telescoping handle is stored flush with the rim.

16. The basket of claim 14, further comprising a floor and a plurality of openings provided substantially in the floor, the plurality of openings for passing dirt accumulated on the plurality of wheels of the like-basket.

17. The basket of claim 16, wherein each of the plurality of openings are proximal to a respective corner formed by two walls and are sized to have at least one dimension approximate to a diameter of one of the wheels.

18. The basket of claim 14, further comprising a hinged handle for carrying the basket.

19. The basket of claim 18, wherein the hinged handle is stored flush with the rim.

20. The basket of claim 14, wherein when a like-basket is nested in the basket in the first stored position, at least 80% of a length of the like-basket is nested inside the basket, as measured by a first perpendicular distance from a basket floor of the like-basket to the rim of the basket relative to a second perpendicular distance from the basket floor of the like-basket to a rim of the like-basket.

21. The basket of claim 14, wherein a like-basket is nestable in the basket in a first and a second stored position, the first stored position being one wherein the rear walls are proximate to each other, the second stored position being one wherein the rear walls are distal from each other.

22. A basket for public use, the basket comprising:
a body made of a durable material, the body comprising a rim, an open top, a first side, and a floor, the body defining an interior space;
a telescoping handle for placing the body in an angled position, the telescoping handle comprising a plurality of lateral segments, the telescoping handle being movably secured to only the first side of the body and being extendible parallel to the first side from a stored handle position to an extended handle position customizable to a preferred height of a user;
a plurality of wheels for rolling the body once the body is placed in the angled position;
a plurality of guide rails associated with the first side, the plurality of guide rails for guiding the respective lateral segments;
a plurality of movable sliders, each slider limiting a vertical displacement of a corresponding lateral segment relative to the basket and preventing swiveling of the corresponding lateral segment relative to the basket; and
a pair of longitudinal protrusions associated with at least one guide rail for preventing obstruction the lateral segments during movement;
wherein when the telescoping user-adjustable handle is disposed on an outside of the first side, the plurality of movable sliders jut into the interior space,
wherein when the telescoping user-adjustable handle is disposed on an inside of the first side, the plurality of movable sliders jut outside of the interior space;
wherein a like-basket is nestable in the basket in a first and a second stored position, the first stored position being one wherein the telescoping handles are proximate to each other, the second stored position being one wherein the telescoping handles are distal from each other.

23. The basket of claim 22, wherein the telescoping handle is stored flush with the rim.

24. The basket of claim 22, further comprising a plurality of openings provided substantially in the floor, the plurality of openings for passing dirt accumulated on the plurality of wheels of the like-basket.

25. The basket of claim 22, further comprising a hinged handle for carrying the basket.

26. The basket of claim 25, wherein the hinged handle is stored flush with the rim.

27. The basket of claim 22, wherein the plurality of wheels consists of two wheels.

28. The basket of claim 2, wherein when a like-basket is nested in the basket in the first stored position, at least 80% of a length of the like-basket is nested inside the basket, as measured by a first perpendicular distance from a basket floor of the like-basket to the rim of the basket relative to a second perpendicular distance from the basket floor of the like-basket to a rim of the like-basket.

* * * * *